United States Patent
Seo (10) Patent No.: US 8,321,203 B2
(45) Date of Patent: Nov. 27, 2012

(54) APPARATUS AND METHOD OF GENERATING INFORMATION ON RELATIONSHIP BETWEEN CHARACTERS IN CONTENT

(75) Inventor: Ju-hee Seo, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1225 days.

(21) Appl. No.: 12/106,435

(22) Filed: Apr. 21, 2008

(65) Prior Publication Data

US 2009/0063157 A1  Mar. 5, 2009

(30) Foreign Application Priority Data

Sep. 5, 2007 (KR) .................. 10-2007-0089970

(51) Int. Cl.
*G06F 17/21* (2006.01)

(52) U.S. Cl. .................. 704/10; 704/1; 704/9; 704/235; 725/135; 348/465

(58) Field of Classification Search .................. 704/270, 704/9, 1, 10, 235; 725/135; 348/465
See application file for complete search history.

(56) References Cited

U.S. PATENT DOCUMENTS

| | | | | |
|---|---|---|---|---|
| 5,182,708 A | * | 1/1993 | Ejiri ................................ | 704/1 |
| 5,576,954 A | * | 11/1996 | Driscoll ............................. | 1/1 |
| 7,263,530 B2 | * | 8/2007 | Hu et al. ............................. | 1/1 |
| 7,607,083 B2 | * | 10/2009 | Gong et al. ................... | 715/254 |
| 2001/0049596 A1 | * | 12/2001 | Lavine et al. ..................... | 704/9 |
| 2002/0051077 A1 | * | 5/2002 | Liou et al. ...................... | 348/465 |
| 2003/0154084 A1 | * | 8/2003 | Li et al. .......................... | 704/273 |
| 2005/0097621 A1 | * | 5/2005 | Wallace et al. ............... | 725/135 |
| 2006/0129927 A1 | * | 6/2006 | Matsukawa ................... | 715/532 |
| 2010/0049703 A1 | * | 2/2010 | Coiera .............................. | 707/5 |

FOREIGN PATENT DOCUMENTS

| | | |
|---|---|---|
| KR | 2006-34494 | 4/2006 |
| KR | 2007-12891 | 1/2007 |

* cited by examiner

*Primary Examiner* — Talivaldis Ivars Smits
*Assistant Examiner* — Shaun Roberts
(74) *Attorney, Agent, or Firm* — Stanzione & Kim, LLP (57) ABSTRACT

A method of generating information on relationships between characters of a content includes dividing a text extracted from the content into one or more predetermined units, determining one or more dominant relationships between characters of the content by comparing the divided units with relationship keyword information in which keywords contained in categories are defined, wherein the categories represent one or more relationships between the characters, and generating information on the relationships between the characters in accordance with the determined dominant relationships.

The dominant relationships are determined by matching the divided units of text to the categories with reference to the relationship keyword information, counting the number of divided units of text corresponding to each of the categories, and determining the relationship represented by the category measured by the highest number of divided units of text.

30 Claims, 5 Drawing Sheets

| CATEGORY (310) | | | |
|---|---|---|---|
| | GOODWILL (312) | HOSTILITY (314) | LOVE (316) |
| KEYWORDS (320) | GOOD FRIENDLY KIND ⋮ | BAD DISLIKE VULGAR ⋮ | FLUTTERING LOVELY MISSING ⋮ | ...

APPARATUS AND METHOD OF GENERATING INFORMATION ON RELATIONSHIP BETWEEN CHARACTERS IN CONTENT

CROSS-REFERENCE TO RELATED APPLICATIONS

This application claims priority under 35 U.S.C. §119(a) from Korean Patent Application No. 10-2007-0089970, filed on Sep. 5, 2007, in the Korean Intellectual Property Office, the disclosure of which is incorporated herein in its entirety by reference.

BACKGROUND OF THE INVENTION

1. Field of the Invention

The present general inventive concept relates to a method and apparatus to generate information on a relationship between characters in contents.

2. Description of the Related Art

Multimedia content services can be provided through a variety of media such as the Internet, mobile devices, televisions, and the like, and the number of multimedia content services is growing exponentially. As the amount of multimedia contents has dramatically increased, there has been an increasing demand for technologies allowing a user to quickly ascertain the gist of multimedia contents.

When the content is a video file, a method of outputting a specific scene that is selected according to a predetermined standard is well-known as one of the technologies allowing the user to quickly ascertain the gist of the multimedia contents.

For example, when the content is a video file of a soccer game, only a scene generating a noise higher than a predetermined level may be selected and provided to the user. That is, this method utilizes a feature that the spectators generally cheer when a team scores a goal or gets a good chance to score a goal. That is, a circumstance in which a loud noise is generated is determined as an important scene and provided to the user.

In addition, when the content is a video file, a method of quickly reproducing a varied scene of an overall video file by increasing a sampling rate of a portion having lots of changes in a screen (e.g., changes in a color, motion, and the like) and reducing the sampling rate of a portion having relatively moderate changes in the screen may be used.

However, the above-described methods cannot be utilized when the contents are plot-oriented video files such as dramas or movies, since the above-described methods cannot summarize the overall plot of the content.

Meanwhile, when the contents are plot-oriented video files or electronic books, information on relationships between characters of the content may be beneficial in understanding the plot of the content.

However, a method of generating information on relationships between characters of a content and providing the information to the user has not been provided in the prior art.

SUMMARY OF THE INVENTION

The present general inventive concept provides an apparatus and method of generating information on one or more relationships between characters of a content, which can allow a user to quickly understand a plot of the content.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of generating information on one or more relationships between characters of a content, the method including dividing a text extracted from the content into one or more predetermined units; determining one or more dominant relationships between characters of the content by comparing the divided units with relationship keyword information in which keywords contained in categories are defined, wherein the categories represent one or more relationships between the characters; and generating information on the relationships between the characters in accordance with the determined dominant relationships.

The determining of the dominant relationships may include matching the divided units to the categories with reference to the relationship keyword information, counting the number of divided units corresponding to each of the categories, and determining a relationship represented by the category corresponding to the highest number of divided units of text as the dominant relationship between the characters.

The matching of the divided units to the categories may include matching the divided units containing additional information to the categories according to contents defined in the additional information.

The dividing of the text may include dividing the text extracted from the contents into word units or idiom units.

The method may further include extracting information on at least one of a title of a position, calling name, nickname, feature, picture, and voice of each character of the content from metadata of the content, and the determining of the dominant relationships may include determining the dominant relationships using the information extracted from the metadata.

The generating of the information may be performed using the information extracted from the metadata.

The method may further include selecting at least one of the characters to generate the information on the relationships between the characters, and the generating of the information includes generating information on relationships between the selected characters.

The generating of the information may include generating the information on the relationships between the characters with reference to a predetermined time interval or a predetermined specific character.

Each of the categories of the relationship keyword information may be classified in accordance with at least one of a social position relationship between the characters and emotional feelings of the characters.

The content may be one of a video file, an audio file, and an electronic book.

The foregoing and/or other aspects and utilities of the present general inventive concept may also be achieved by providing an apparatus to generate information on one or more relationships between characters of a content, the apparatus including a text dividing unit to divide a text extracted from a content into one or more predetermined units; a relationship determining unit to determine one or more dominant relationships between characters of the content by comparing the divided units with relationship keyword information in which keywords contained in the categories are defined, wherein the categories represent one or more relationships between the characters; and an information generation unit to generate information on the relationships between the characters in accordance with the determined dominant relationships. The relationship determining unit may include a match-up portion to match the divided units to the categories according to the relationship keyword information, a counting portion count the number of the divided units corresponding to each of the categories, and a determining portion to determine a relationship represented by the category corresponding to the highest number of divided units of text as the dominant relationship between the characters.

The apparatus may further include an information extracting unit to extract information on at least one of a title of a position, calling name, nickname, feature, picture, and voice of each character of the content from metadata of the content, and the relationship determining unit may determine the dominant relationships between the characters using the information extracted from the metadata.

The foregoing and/or other aspects and utilities of the present general inventive concept may also be achieved by providing a computer readable recording medium having recorded thereon a program to execute a method of generating information on relationships between characters of a content, the method including dividing text extracted from the content into predetermined units, determining one or more dominant relationships between the characters by comparing the divided units of text with a plurality of categories representing relationships between the characters and relationship keyword information in which keywords contained in the categories are defined, and generating information on the relationships between the characters in accordance with the determined dominant relationships.

The foregoing and/or other aspects and utilities of the present general inventive concept may also be achieved by providing an apparatus to generate information on a content, the apparatus including a relationship determining unit to determine a relationship between first and second characters of a content according to relationship keyword information, and an information generation unit to generate a signal representing a first image representing the first character, a second image representing the second character, and a third image representing the determined relationship.

The content may include a plurality of sections and a plurality of subtitles representing the plurality of sections, and the relationship determining unit may determine the relationship between first and second characters of the content according to the relationship keyword information and the subtitles.

The subtitles each may comprise one or more units, and the relationship determining unit may determine the relationship between first and second characters of the content according to the relationship keyword information and the one or more units of the subtitles.

The content may include a plurality of characters, and the information generation unit may generate a second signal representing a plurality of images to correspond to the plurality of characters such that the first and second characters are selected from the plurality of images.

The signal of the information generation unit may include a user interface to be displayed on a screen, the first image and the second may be spaced apart from each other within the user interface, and the third image may be disposed between the first image and the second image within the user interface.

The third image may be spaced apart from the first and second images by a distance representing a time period.

The apparatus may further include a reproducing unit to generate another signal representing a moving image of the content.

The first, second, and third images of the signal may be displayed on a first screen, and the moving image of the another signal may be displayed on a second screen.

The signal and the another signal may be simultaneously generated to be simultaneously displayed on a screen.

The signal and the another signal may be separately generated to be displayed on a screen at a time interval.

The foregoing and/or other aspects and utilities of the present general inventive concept may also be achieved by providing a method of an apparatus to generate information on a content, the method including determining a relationship between first and second characters of a content according to relationship keyword information, and generating a signal representing a first image representing the first character, a second image representing the second character, and a third image representing the determined relationship.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
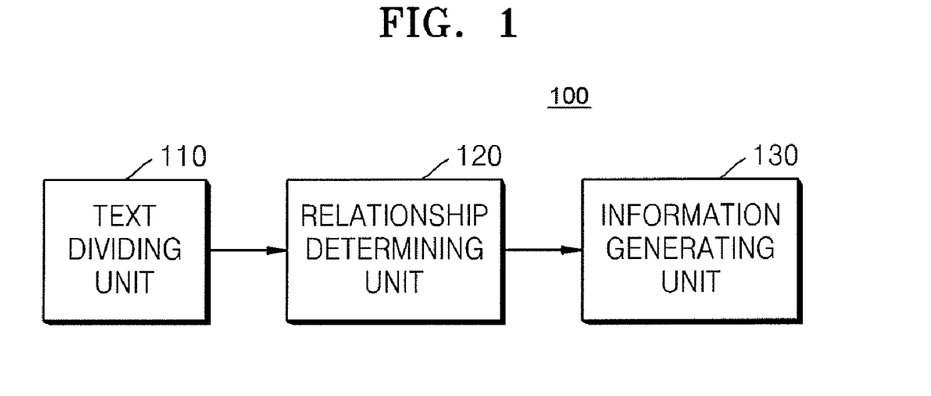
FIG. 1 is a block diagram illustrating an apparatus to generate information on one or more relationships between characters of a content according to an embodiment of the present general inventive concept.

FIG. 1 is a block diagram illustrating an apparatus 100 to generate information on one or more relationships between characters included in a content according to an embodiment of the present general inventive concept. Referring to FIG. 1, the apparatus to generate the information on the relationships between the characters of the content according to the current embodiment of the present general inventive concept includes a text dividing unit 110, a relationship determining unit 120, and an information generating unit 130. The apparatus 100 may further include a reproducing unit (not shown) to extract reproducible data from the content, to generate from the reproducible data an image signal to be displayed as an image on a screen of a display unit (not shown) connected to the apparatus 100, and to generate from the reproducible data an audio signal to be generated as sound through a speaker unit (not shown) connected to the apparatus 100. Accordingly, the apparatus 100 may be a player to generate the image signal and the audio signal from the content stored in a storage medium, such as a disk medium, a semiconductor memory unit, etc. In this case, the reproducing unit of the apparatus 100 may further include a structure and a circuit to read the storage medium to generate data corresponding to the content. It is possible that the apparatus 100 may receive the data from an external device through a wired or wireless communication line or network. The external device may be a multimedia content service provider. It is also possible that the display unit may be a unit built in the apparatus 100 as a single integrated body.

The text dividing unit 110 divides a text extracted from the content into predetermined units. The text dividing unit 110 may receive the text from the reproducing unit or may extract the text from the content.

Here, the content may be one of a video file, an audio file, and an electronic book file. However, the present general inventive concept is not limited to such files. The content may be any file containing text. The video file may include a plurality of subtitles each having a text representing the corresponding subtitles.

For example, when the content is a video file, the text dividing unit 110 may divide the subtitles extracted from the content into word units or idiom units.

For example, if the subtitle is "Chul-Soo loves his father," the text dividing unit 110 may divide the subtitle into three words "Chul-Soo," "Loves," and "Father."

In another example, for an expression "Chul-Soo is a big frog in a small pond," the text dividing unit 110 may not divide the expression into word units "Chul-Soo," "Is," "Big," "Frog," "In," "Small," "Pond," but into "Shul-Soo Is" and "Big Frog In a Small Pond" since the phrase "Big Frog in a Small Pond" is an idiom.

The relationship determining unit 120 determines one or more dominant relationships between the characters of the content by comparing the units divided by the text dividing unit 110 with relationship keyword information including a plurality of categories representing the relationships between the characters of the content and a plurality of keywords contained in each of the categories.

Figure 2:
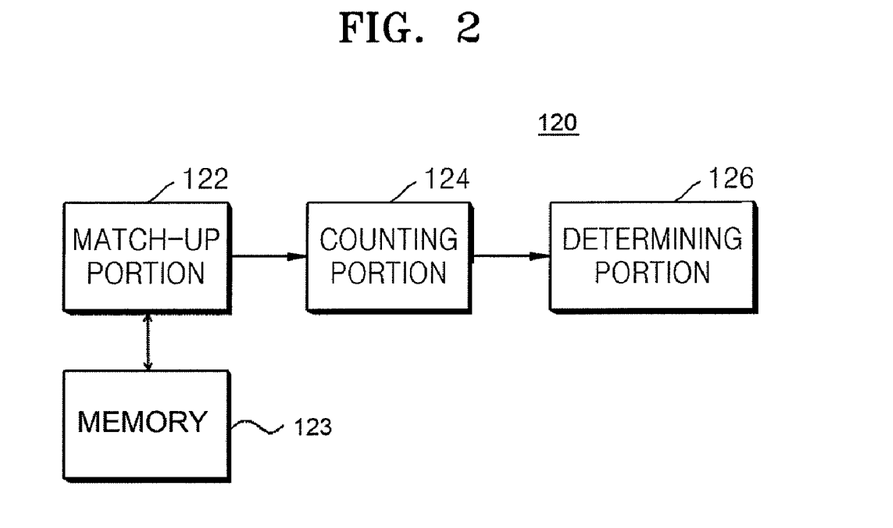
FIG. 2 is a block diagram illustrating a relationship determining unit of the apparatus of FIG. 1 according to an embodiment of the present general inventive concept.

FIG. 2 is a block diagram illustrating the relationship determining unit 120 of the apparatus of FIG. 1 according to an embodiment of the present general inventive concept.

Referring to FIG. 2, the relationship determining unit 120 according to the current embodiment of the present general inventive concept includes a match-up portion 122, a counting portion 124, and a determining portion 126. The relationship determining unit 120 may further include a memory 123 to store the plurality of categories and the plurality of keywords.

The match-up portion 122 compares the respective units of the text divided by the text dividing unit 110 to the respective categories of the relationship keyword information and determines whether the respective units matches the respective categories.

Figure 3:
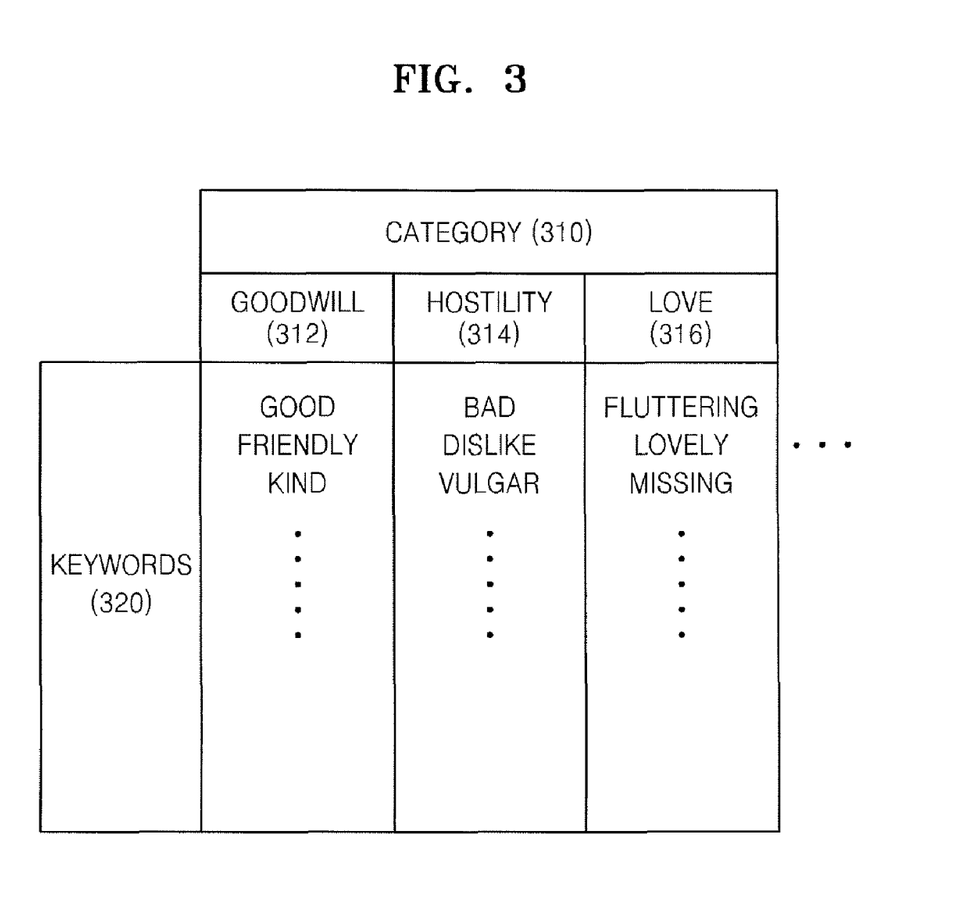
FIG. 3 illustrates an example of relationship keyword information according to an embodiment of the present general inventive concept.

FIG. 3 illustrates an example of the relationship keyword information according to an embodiment of the present general inventive concept.

Referring to FIG. 3, the relationship keyword information includes categories 310 and keywords 320 corresponding to the respective categories 310. According to the current embodiment of the present general inventive concept, the categories 310 of the relationship keyword information may include "goodwill" 312, "hostility" 314, and "love" 316. However, the present general inventive concept is not limited to such categories.

In addition, according to the current embodiment of the present general inventive concept, the categories 310 are classified according to kinds of emotional feelings. However, the categories 310 may be classified according to one or more social position relationships between the characters. For example, "father and son" is a category which means a social position relationship.

Keywords are defined to correspond to each of the "goodwill" 312, "hostility" 314, and "love" 316.

For example, keywords such as "good," "friendly," and "kind" may be defined in the category "goodwill" 312. Keywords such as "bad," "dislike," and "vulgar" may be defined in the category "hostility" 314. Keywords such as "fluttering," "lovely," and "missing" may be defined in the category "love" 316.

Although not illustrated in FIG. 3, the categories of the relationship keyword information may further include a category "lover." In this case, pet names used between lovers, such as "darling," and "honey" may be defined in the category "lover." The keywords may be provided in the form of words as described above. However, the keywords may be provided in the form of idioms in certain circumstances.

The relationship keyword information may be received from an external device or stored in the form of a database in the apparatus to generate the information on the relationships between the characters of the content.

The match-up portion 122 matches the text divided by the text dividing unit 110 to at least one of the categories "goodwill" 312, "hostility" 314, and "love" 316 by comparing the divided text, i.e., the divided unit, with the keywords defined in the categories 312, 314, and 316 of the relationship keyword information.

Meanwhile, if there is any divided unit containing additional information among the units of the text divided by the text dividing unit 110, the match-up portion 122 matches the unit containing the additional information to the categories of the relationship keyword information according to contents defined in the additional information.

For example, when friends use bad language to express an affinity for each other during a conversation between them, the match-up portion 122 may erroneously match a text containing the bad language to the category "hostility" even though the relationship between the friends is good. In order to prevent this problem, information showing that the text containing the bad language contains words expressing affinity may be additionally added to the text containing the bad language according to a friendship between them.

The match-up portion 122 reads the additional information contained in the text and matches the text correspond to one of the categories of the relationship keyword information in accordance with the contents of the additional information.

Since the additional information is not information the user can see but information usable to match the text to the category, the additional information can be formed in, for example, a hidden text the user cannot see or recognize.

In this case the subtitle may include a first text to be divided as a unit by the text dividing unit 110 and to be displayed on a screen of the display unit connected to the apparatus 100 as the subtitle representing a subject of the subtitle, and a second text to be divided as a unit of additional information by the text dividing unit and not to be displayed on the screen of the display unit as a unit. The units of the first text and the second text can be compared to the relationship keyword information so as to determine the relationship between the characters of the content. According to another embodiment of the invention, when the first text to be divided as a unit is displayed on the screen of the display unit, reproducible data can be displayed as an image on the other screen of the display unit.

The counting portion 124 counts the number of divided units of the text corresponding to each of the categories of the relationship keyword information.

The determining portion 126 determines a relationship represented by the category corresponding to the highest number of the divided units of the text as the mutual relationship between the characters according to the counting results of the counting portion 124.

For example, after the match-up portion 122 matches the divided units of text to each of the categories, the counting portion 124 may determine that the number of divided units of text corresponding to the category "goodwill" is 72, the number of divided units of text corresponding to the category "hostility" is 5, and the number of divided units of text corresponding to the category "love" is 34. Thus, the determining portion 126 determines the category "goodwill" 312 corresponding to the highest number of divided units of text as the relationship between the characters. That is, it is determined that the mutual relationship between the characters is good.

When the relationships between the characters are determined by the relationship determining unit 120, the information generating unit 130 generates information on the relationships between the characters according to the determination of the relationship determining unit 120. The information generation unit 130 may generate information on the relationships of the characters with reference to a predetermined time interval or a predetermined specific character.

Figure 4:
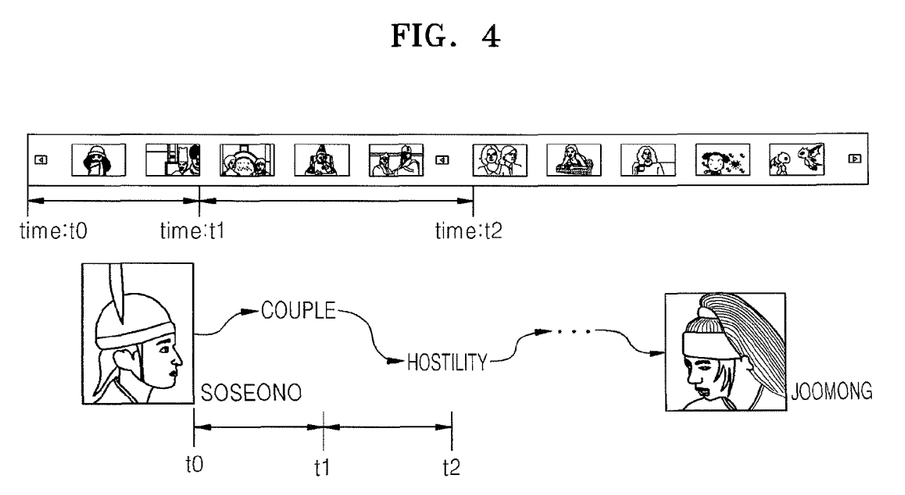
FIG. 4 illustrates an example of information on relationships between characters according to an embodiment of the present general inventive concept.

FIG. 4 illustrates an example of information on a relationship between characters according to an embodiment of the present general inventive concept.

Referring to FIG. 4, the information is an example regarding a relationship between two characters, such as "Soseono" and "Joomong" in a video file with reference to a predetermined time interval. Before the apparatus 100 to generate information on the relationship between the characters of the content according to the embodiment illustrated in FIG. 1 performs a process of generating information on the relationship between the characters, the user selects the two characters of "Soseono" and "Joomong" among a plurality of characters of the content, and the information generating unit 130 generates the information on the relationship between the selected characters of "Soseono" and "Joomong" according to the selection of the user.

The apparatus 100 to generate information may further include a character selecting unit to select at least one character that will be utilized to generate information on the relationships between the characters. The character selecting unit may be included in the reproducing unit or the information generating unit 130 to generate a user interface to display a plurality of characters on the screen of the display unit so as for the user to select one or more characters among the displayed plurality of characters. It is possible that the one or more characters can be automatically selected from each of the subtitles among the plurality of characters of the content.

Referring to FIG. 4, the two characters of "Soseono" and "Joomong" are a couple, for example, a married couple, during a period from t0 to t1 and have a hostile relationship during a period from t1 to t2.

As described above, the relationship between the characters may be expressed in accordance with kinds of feelings as well as a social position relationship between the characters. For example, the two characters of "Soseono" and "Joomong" may be shown as having a loving relationship during the period from t0 to t1 and having a hostile relationship during the period from t1 to t2.

As described above, by generating information on the relationship between characters with reference to a predetermined time interval, the user can ascertain the gist of the content in a short time.

Meanwhile, when generating information on the relationship between the characters, the information generating unit 130 may more precisely generate information on the relationship between the characters using metadata of the content in addition to the divided units of text.

For example, FIG. 4 illustrates an example of information on the relationship between the characters of "Soseono" and "Joomong" using pictures of the characters of "Soseono" and "Joomong", which are obtained from the metadata of the content.

When information that cannot be obtained from the divided units of the text is extracted from the metadata, the information generating unit 130 can more precisely generate information on the mutual relationship between the characters using at least one of a social a position, calling name, nickname, feature, picture, and voice of each character.

The apparatus to generate information on relationships between characters of a content may further include an information extracting portion to receive data corresponding to the content to extract information on at least one of a title of a position, calling name, nickname, feature, picture, and voice of each character. The information extracting portion may be included in the reproducing unit or the text dividing unit 110.

Meanwhile, in order to determine a mutual relationship between the characters, the relationship determining unit 120 utilizes the information extracted by the information extracting portion and/or the units of the text divided by the text dividing unit 110.

For example, the information extracting portion may extract information on the title of a position, calling name, nickname, feature, picture, and voice of each character to classify the characters. The extracted information can provide the information that cannot be obtained from the units of text divided by the text dividing unit 110.

In one embodiment, when the content is a video file, one of the characters may talk with another character without using a name of the character but using a pronoun such as "you." In this case, since the relationship determining unit 120 may not identify the character called "you" by simply analyzing the dialogue between the characters, it may not be easy to generate information on the relationship between the characters using text including the pronoun.

However, if pictures of the characters can be extracted from the metadata by the information extracting portion, the relationship determining unit 120 can identify the dialogue between the characters by analyzing the pictures and dialogue of the characters speaking in the content. Therefore, the relationship determining unit 120 can generate the relationship between the characters by analyzing the dialogue between the characters. In addition, when the information extracting portion extracts the voices of the characters from the metadata, the relationship determining unit 120 can generate the relationship information between the characters.

Meanwhile, the information to identify the characters may be classified using a predetermined index. For example, when there are characters of "Soseono" and "Joomong," the information for identifying the character of "Soseono" is classified as an index C1 and the information for identifying the character of "Joomong" is classified as an index C2. At this point, each of the indexes C1 and C2 may include a title of a position, calling name, nickname, feature, picture, and voice of the corresponding character. The index is used so that the relationship determining unit 120 can easily process the information for identifying the characters.

As described above, the apparatus 100 generates a signal representing a visual image to be displayable on a screen of a display unit to inform a user of a relationship between at least two characters of the content between periods or in the subtitle. The subtitle may include a plurality of periods, and the periods may be included in the plurality of periods. It is possible that the periods may be included in corresponding ones of different subtitles. The visual image may include the keyword included in the relationship keyword information.

Figure 5:
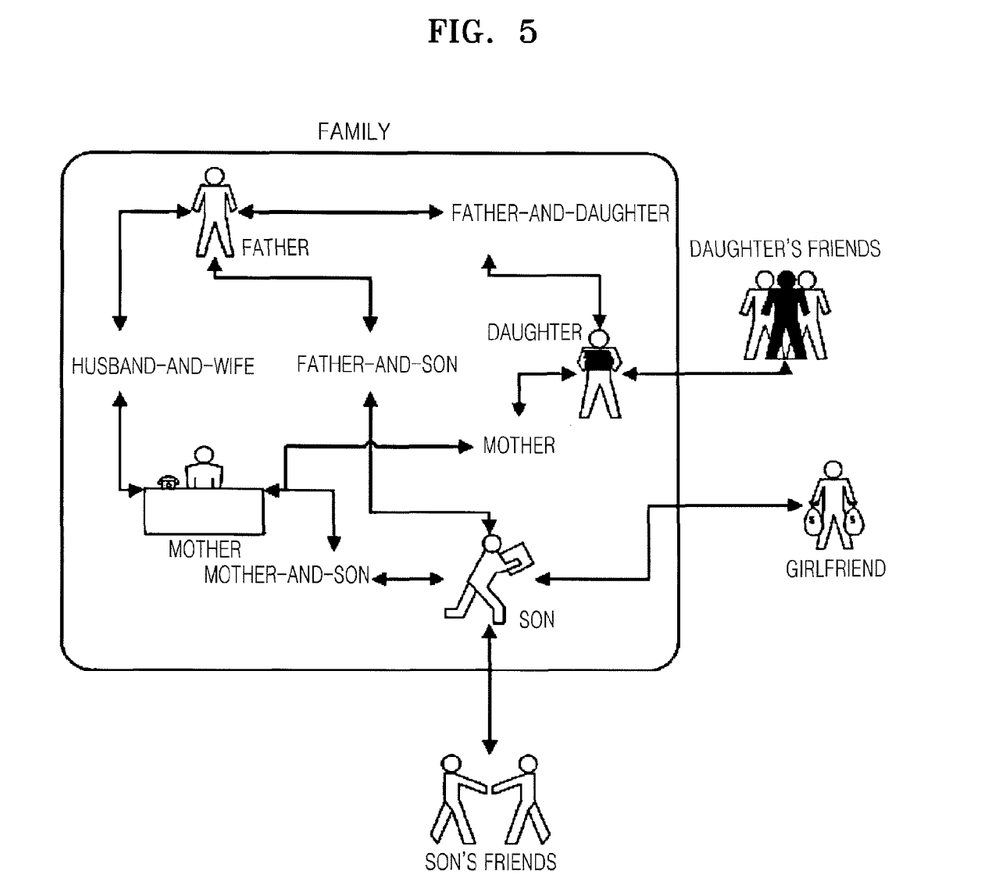
FIG. 5 illustrates an example of information on relationships between characters according to an embodiment of the present general inventive concept.

FIG. 5 illustrates an example of information on one or more relationships between characters according to an embodiment of the present general inventive concept. FIG. 5 illustrates information on relationships between characters, wherein the information is obtained from a third character standpoint with respect to the characters. Referring to FIG. 5, a relationship between a father and a mother is a married couple and a relationship between the father and a daughter is a father-and-daughter relationship. In addition, a relationship between the father and a son is a father-and-son relationship.

FIG. 5 also illustrates information on relationship among the characters when the characters are not selected. In this case, the information on the relationships between all the characters of the content is generated from a third character standpoint.

However, when the user wishes to display the information on the relationships between the characters from the father standpoint, the relationships between the characters can be displayed with reference to the father by the user selecting the father through the character selecting unit. Furthermore, when the user selects the father, mother, and son, the relationships between them can be displayed.

Meanwhile, the generated information on the relationships between the characters may be stored and reused by the user or distributed to other persons by the user.

Figure 6:
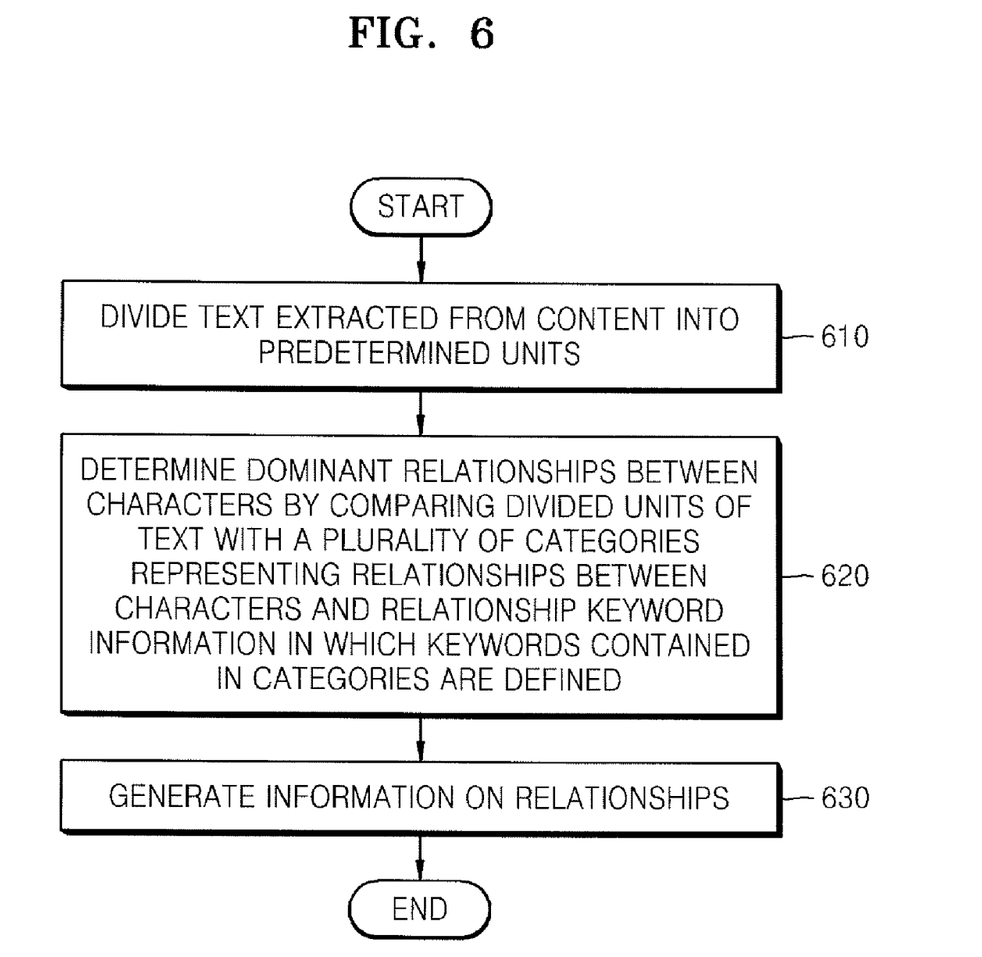
FIG. 6 is a flowchart illustrating a method of generating information on a relationship between characters of a content according to an embodiment of the present general inventive concept.

FIG. 6 is a flowchart illustrating a method of generating information on one or more relationships between characters of a content according to an embodiment of the present general inventive concept.

A text is extracted from a content and is first divided into predetermined units in operation S610.

One or more relationships between the characters of the content are determined by comparing the divided units of text with a plurality of categories representing relationships between the characters and relationship keyword information in which keywords contained in the categories are defined in operation S620.

Information on the relationships between the characters is generated in accordance with the determined dominant relationships in operation S630.

Meanwhile, the above-described embodiments may be realized in the form of programs that can be executed by a computer. The program may be stored in a recording medium that can be read by a normal digital computer.

That is, the present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of generating information on a content, the method comprising:
dividing a text extracted from the content into one or more predetermined units;
determining one or more dominant relationships between characters of the content by comparing the divided units with relationship keyword information in which keywords contained in categories are defined, wherein the categories represent one or more relationships between the characters; and
generating information on the relationships between the characters in accordance with the determined dominant relationships,
wherein the determining of the dominant relationships comprises:
matching the divided units of text to the categories with reference to the relationship keyword information;
counting the number of divided units of text corresponding to each of the categories; and
determining a relationship represented by the category measured by the highest number of divided units of text as the dominant relationship between the characters.

2. The method of claim 1, wherein the matching of the divided units to the categories comprises matching the divided units containing additional information among the divided units to the categories according to the content defined in the additional information.

3. The method of claim 1, wherein the dividing of the text comprises dividing the text extracted from the contents into one or more word units or idiom units as the predetermined units.

4. The method of claim 1, further comprising:
extracting second information on at least one of a title of a position, calling name, nickname, feature, picture, and voice of each character of the content from metadata of the content, wherein the determining of the dominant relationships is performed using the information extracted from the metadata.

5. The method of claim 4, wherein the generating of the information on the relationship comprises generating the information on the relationship using the second information extracted from the metadata.

6. The method of claim 1, further comprising:
selecting at least one of the characters to generate the information on the relationships between the characters,
wherein the generating of the information comprises generating the information on relationships between the selected characters.

7. The method of claim 1, wherein the generating of the information comprises generating the information on the relationships between the characters with reference to a predetermined time interval or a predetermined specific character of the content.

8. The method of claim 1, wherein each of the categories of the relationship keyword information is classified according to at least one of a social position relationship between the characters and emotional feelings of the characters.

9. The method of claim 8, wherein the content is one of a video file, an audio file, and an electronic book.

10. An apparatus to generate information on a content, the apparatus comprising:
a text dividing unit to divide a text extracted from a content into one or more predetermined units;
a relationship determining unit to determine one or more dominant relationships between characters of the content by comparing the divided units with relationship keyword information in which keywords contained in the categories are defined, wherein the categories represent one or more relationships between the characters, the relationship determining unit comprising:
a match-up portion to match the divided units to the categories with reference to the relationship keyword information;
a counting portion to count the number of the divided units corresponding to each of the categories; and
a determining portion to determine a relationship represented by the category corresponding to the highest number of the divided units as the dominant relationship between the characters; and
an information generation unit to generate information on the relationships between the characters in accordance with the determined dominant relationships.

11. The apparatus of claim 10, wherein the match-up portion matches the divided units containing additional information among the divided units to the categories according to the content defined in the additional information.

12. The apparatus of claim 10, wherein the text dividing unit divides the text extracted from the contents into one or more word units or idiom units as the predetermined units.

13. The apparatus of claim 10, further comprising:
an information extracting unit to extract second information on at least one of a title of a position, calling name, nickname, feature, picture, and voice of each character of the content from metadata of the content,
wherein the relationship determining unit determines the dominant relationships between the characters using the second information extracted from the metadata.

14. The apparatus of claim 13, wherein the information generating unit generates the information on the dominant relationships between the characters using the second information extracted from the metadata.

15. The apparatus of claim 10, further comprising:
a character selecting unit to select at least one of the characters, to generate information on the dominant relationships between the selected characters,
wherein the information generating unit generates information on the dominant relationships between the selected characters.

16. The apparatus of claim 10, wherein the information generating unit generates the information on the dominant relationships between the characters with reference to a predetermined time interval or a predetermined specific character of the content.

17. The apparatus of claim 10, wherein each of the categories of the relationship keyword information is classified according to at least one of a social position relationship between the characters and emotional feelings of the characters.

18. The apparatus of claim 10, wherein the content is one of a video file, an audio file, and an electronic book.

19. A computer-readable medium to contain computer-readable codes as a computer-readable program to execute a method, the method comprising:
dividing a text extracted from the content into predetermined units;
determining one or more dominant relationships between the characters by comparing the divided units with relationship keyword information in which keywords contained in the categories are defined, wherein the categories represent one or more relationships between the characters; and
generating information on the relationships between the characters in accordance with the determined dominant relationships,
wherein the determining of the dominant relationships comprises:
matching the divided units of text to the categories with reference to the relationship keyword information;
counting the number of divided units of text corresponding to each of the categories; and
determining a relationship represented by the category corresponding to the highest number of divided units of text as the dominant relationship between the characters.

20. An apparatus to generate information on a content, the apparatus comprising:
a relationship determining unit to determine a relationship between first and second characters viewable to a user of a content according to relationship keyword information and according to additional hidden information that a user cannot see or recognize, to compare divided units of text of the content with relationship keyword information in which keywords contained in categories are defined, wherein the categories represent one or more relationships between the characters, the relationship determining unit including a determining portion to determine a relationship represented by a category corresponding to the highest number of the divided units as a dominant relationship between the characters; and
an information generation unit to generate a signal representing a first image representing the first character, a second image representing the second character, and a third image representing the determined relationship.

21. The apparatus of claim 20, wherein:
the content comprises a plurality of sections and a plurality of subtitles representing the plurality of sections; and
the relationship determining unit determines the relationship between first and second characters of the content according to the relationship keyword information and the subtitles.

22. The apparatus of claim 21, wherein:
the subtitles each comprise one or more units; and
the relationship determining unit determines the relationship between first and second characters of the content according to the relationship keyword information and the one or more units of the subtitles.

23. The apparatus of claim 20, wherein:
the content comprises a plurality of characters; and
the information generation unit generates a second signal representing a plurality of images to correspond to the plurality of characters such that the first and second characters are selected from the plurality of images.

24. The apparatus of claim 20, wherein:
the signal of the information generation unit comprises a user interface to be displayed on a screen;
the first image and the second are spaced apart from each other within the user interface; and
the third image is disposed between the first image and the second image within the user interface.

25. The apparatus of claim 24, wherein the third image is spaced apart from the first and second images by a distance representing a time period.

26. The apparatus of claim 20, further comprising: a reproducing unit to generate another signal representing a moving image of the content.

27. The apparatus of claim 26, wherein:
the first, second, and third images of the signal are displayed on a first screen; and
the moving image of the another signal is displayed on a second screen.

28. The apparatus of claim 26, wherein the signal and the another signal are simultaneously generated to be simultaneously displayed on a screen.

29. The apparatus of claim 26, wherein the signal and the another signal are separately generated to be displayed on a screen at a time interval.

30. A method of an apparatus to generate information on a content, the method comprising:
determining a relationship between first and second characters viewable to a user of a content according to relationship keyword information and according to additional hidden information that a user cannot see or recognize;
comparing divided units of text of the content with relationship keyword information in which keywords contained in categories are defined, the categories representing one or more relationships between the first and second characters;
determining a relationship represented by a category corresponding to the highest number of the divided units as a dominant relationship between the characters; and
generating a signal representing a first image representing the first character, a second image representing the second character, and a third image representing the determined relationship.

* * * * *